US010935500B2

(12) United States Patent
Nakagawa et al.

(10) Patent No.: US 10,935,500 B2
(45) Date of Patent: Mar. 2, 2021

(54) WELDING MONITORING SYSTEM AND WELDING MONITORING METHOD

(71) Applicant: Hitachi, Ltd., Tokyo (JP)

(72) Inventors: Ryoji Nakagawa, Tokyo (JP); Hisashi Endou, Tokyo (JP); Hiroshi Yoshikawa, Tokyo (JP); Toshihiro Yamada, Tokyo (JP); Nobuhiro Kakeno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/786,770

(22) Filed: Oct. 18, 2017

(65) Prior Publication Data

US 2018/0113077 A1    Apr. 26, 2018

(30) Foreign Application Priority Data

Oct. 20, 2016    (JP) .............................. JP2016-205721

(51) Int. Cl.
*G01N 21/88* (2006.01)
*B23K 31/12* (2006.01)
*B23K 37/04* (2006.01)

(52) U.S. Cl.
CPC ....... *G01N 21/8806* (2013.01); *B23K 31/125* (2013.01); *B23K 37/04* (2013.01); *G01N 2201/1053* (2013.01)

(58) Field of Classification Search
CPC .. B23K 31/125; B23K 37/04; G01N 21/8806; G01N 2201/1053

(Continued)

(56) References Cited

U.S. PATENT DOCUMENTS 4,644,172 A * 2/1987 Sandland ......... G01N 21/95607
250/548
4,952,058 A * 8/1990 Noguchi ................ G01N 21/94
356/237.5

(Continued)

FOREIGN PATENT DOCUMENTS

CN          1987347 A       6/2007
WO    WO-2005/083399 A1    1/2008

OTHER PUBLICATIONS

Notice of Allowance dated Oct. 4, 2018 issued in co-pending U.S. Appl. No. 16/032,371.

(Continued)

*Primary Examiner* — Tri T Ton (74) *Attorney, Agent, or Firm* — Foley & Lardner LLP (57) ABSTRACT

There are provided a welding monitoring system which can multidimensionally monitor a welding portion with high accuracy and a monitoring method thereof, by using a relatively simple configuration.

There is provided a welding monitoring system which monitors a subject, including: a mechanical portion; and an imaging portion, in which the mechanical portion includes a transport arm which transports the subject, a subject holding portion which holds the subject, and an energizing device which causes welding with respect to the subject to be performed, and in which the imaging portion includes imaging means for obtaining imaging data of the subject, a data recording portion which records the imaging data, an analyzing portion which extracts predetermined characteristics from the imaging data, a comparison determination portion which compares the extracted characteristics and normal characteristics to each other to determine the presence or absence of abnormality, and a determination result output portion which outputs a determination result by the comparison determination portion.

8 Claims, 9 Drawing Sheets

(58) Field of Classification Search
USPC .................. 356/237.1–237.6, 239.1–239.8
See application file for complete search history.

(56) References Cited

U.S. PATENT DOCUMENTS

| | | | |
|---|---|---|---|
| 5,435,478 | A | 7/1995 | Wood et al. |
| 5,517,861 | A * | 5/1996 | Haas ...................... G01N 3/068 |
| | | | 356/237.1 |
| 6,153,853 | A | 11/2000 | Maruyama et al. |
| 6,414,261 | B1 | 7/2002 | Maetschke |
| 6,597,455 | B1 * | 7/2003 | Wlodarski ........... G01N 21/952 |
| | | | 356/430 |
| 6,963,076 | B1 | 11/2005 | Zaman et al. |
| 2006/0165274 | A1 | 7/2006 | Akiyama et al. |
| 2007/0279622 | A1 | 12/2007 | Yamauchi et al. |
| 2009/0084764 | A1 | 4/2009 | Park et al. |
| 2009/0128625 | A1 * | 5/2009 | Loipetsberger .... G01N 21/8806 |
| | | | 348/90 |
| 2009/0159579 | A1 | 6/2009 | Nishio et al. |
| 2010/0004875 | A1 * | 1/2010 | Urano ................ G01N 21/4738 |
| | | | 702/40 |
| 2011/0006047 | A1 | 1/2011 | Penrod et al. |
| 2012/0048838 | A1 | 3/2012 | Ishida et al. |
| 2015/0268663 | A1 | 9/2015 | Daniel et al. |
| 2016/0125762 | A1 | 5/2016 | Becker et al. |

OTHER PUBLICATIONS

Chinese Office Action issued in corresponding Chinese Application No. 201710959777.4, dated Oct. 28, 2019, six (6) pages with partial English translation.
Non-Final Office Action on U.S. Appl. No. 16/032,371 dated Sep. 3, 2020.

* cited by examiner

WELDING MONITORING SYSTEM AND WELDING MONITORING METHOD

CLAIM OF PRIORITY

The present application claims priority from Japanese Patent application serial no. 2016-205721, filed on Oct. 20, 2016, the content of which is hereby incorporated by reference into this application.

TECHNICAL FIELD

The present invention relates to a quality monitoring system which uses optical means, and particularly to an efficient technology employed in quality monitoring of welded products having different sizes.

BACKGROUND ART

When managing the quality of a manufactured product by optical means, there is a case where it is necessary to capture an image not one surface of the manufactured product but multiple surfaces thereof at the same time. For example, in order to perform quality inspection of a welding portion in which two tubular members face each other, there is a case of imaging light emission of the entire circumference of the tube during the welding. In a case where such a light emitting monitoring system is provided on the inside of a welding machine, it is desirable that the imaging can be performed by one camera from the viewpoint of saving an installation space or simplifying a system configuration.

As a background art of the field of the technology, for example, there is a technology, such as Patent Literature 1. In Patent Literature 1, as a method for multidimensionally monitoring a subject by optical means, a method for keeping multiple observation target surfaces in an imaging viewing field of one camera by disposing a prism on the periphery, is disclosed.

CITATION LIST

Patent Literature

PTL 1: WO 2005/083399

SUMMARY OF INVENTION

Technical Problem

A case where components having different sizes exist together as components which flow in a manufacturing line of a welded product which is a subject, is considered. Even when an imaging target surface of the subject having a certain size is focused, the subject having another size is generally out of focus. In other words, in the imaging target, there is a point that approaches or becomes separated from the camera, and thus, an optical path length to the camera changes nonuniformly. Therefore, only by moving the position of the camera, it is not possible to focus on the entire imaging target region. In addition, in order to arrange the optical path lengths, when rearranging an optical system of the prism or the like in accordance with the size of the subject, extra time, machines, and human resources which are required for the rearrangement are necessary.

Above, even in a case of monitoring the subjects having different sizes, it is desirable to configure a system that inspects the quality by imaging the subjects by automatically focusing on the entire imaging target region in accordance with the size.

Here, an object of the present invention is to provide a welding monitoring system which multidimensionally monitors a welding portion with high accuracy and a monitoring method thereof, by using a relatively simple configuration.

Solution to Problem

In order to solve the above-described problem, according to the present invention, there is provided a welding monitoring system which monitors a subject, including: a mechanical portion; and an imaging portion, in which the mechanical portion includes a transport arm which transports the subject, a subject holding portion which holds the subject, and an energizing device which causes welding with respect to the subject to be performed, and in which the imaging portion includes imaging means for obtaining imaging data of the subject, a data recording portion which records the imaging data, an analyzing portion which extracts predetermined characteristics from the imaging data, a comparison determination portion which compares the extracted characteristics and normal characteristics to each other to determine the presence or absence of abnormality, and a determination result output portion which outputs a determination result by the comparison determination portion.

In addition, according to the present invention, there is provided a welding monitoring method for monitoring the subject, including: imaging the subject during attachment and transport to a subject holding portion; imaging the subject before welding, which is held by the subject holding portion; imaging the subject during the welding; imaging the subject after the welding, which is held by the subject holding portion; imaging the subject during detachment and transport from the subject holding portion; extracting predetermined characteristics from each piece of imaging data; determining the presence or absence of abnormality by comparing the extracted characteristics and normal characteristics to each other; and notifying a managing system or a manager of the determined result.

Advantageous Effects of Invention

According to the present invention, by using a relatively simple configuration, it is possible to realize a welding monitoring system which can multidimensionally monitor a welding portion with high accuracy, and a monitoring method thereof.

Other problems, configurations, and effects in addition to those described above will be apparent by the description of the following embodiments.

DESCRIPTION OF EMBODIMENTS

Hereinafter, an aspect (hereinafter, referred to as "embodiment") for realizing the present invention will be described in detail with reference to the drawings. In addition, in each of the drawings, common parts will be given the same reference numerals, and the overlapping description will be omitted.

Example 1

Figure 1:
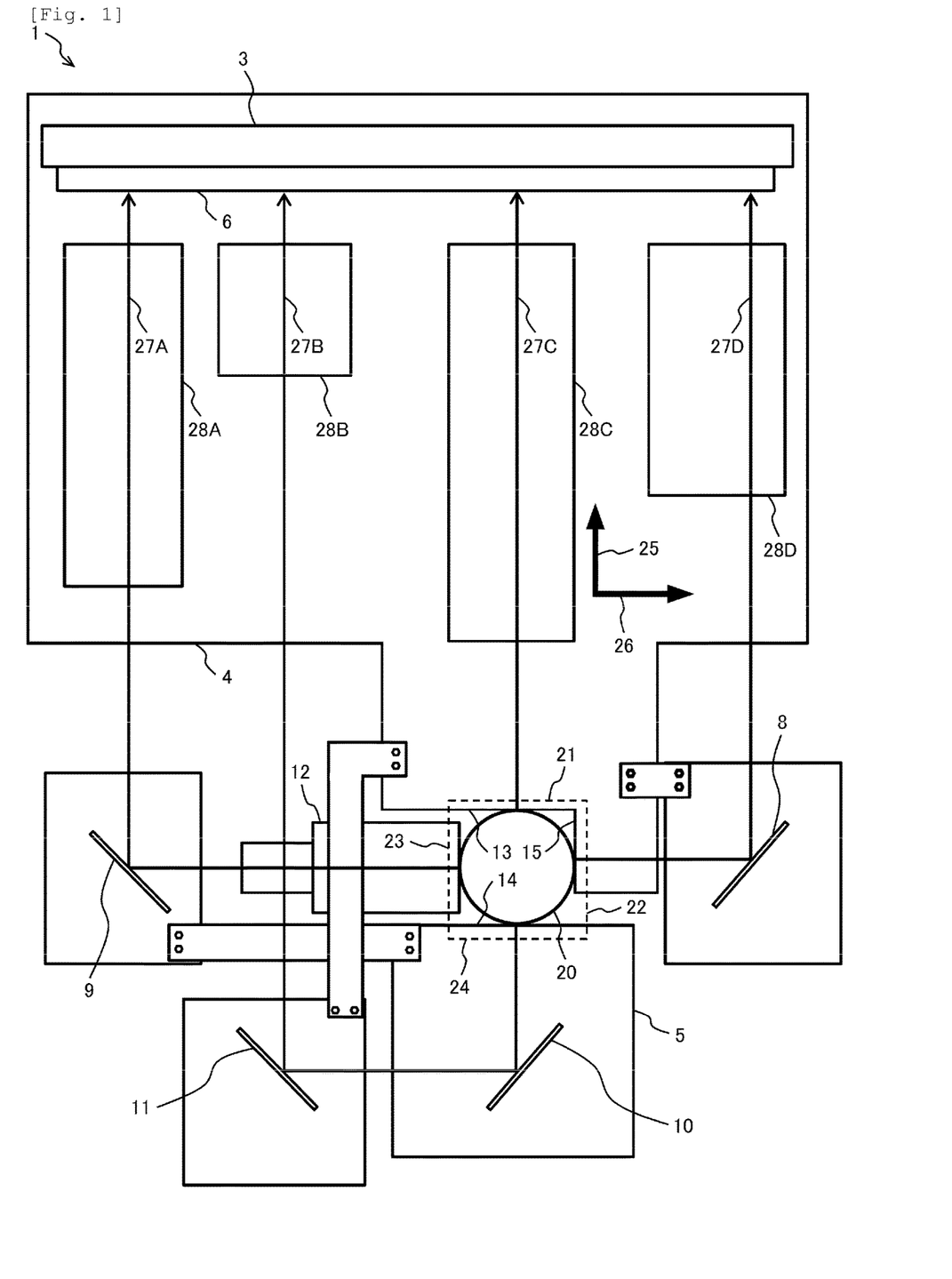
FIG. 1 is a schematic view of a welding monitoring system according to a first embodiment of the present invention.

First, a welding monitoring system according to a first embodiment of the present invention will be described with reference to FIG. 1. FIG. 1 is a schematic view of a welding monitoring system 1 according to the embodiment.

The welding monitoring system 1 of the embodiment includes a welding machine 2, an imaging portion 3, a first holding portion 4, a second holding portion 5, and four mirrors (a first mirror 8, a second mirror 9, a third mirror 10, and a fourth mirror 11). The imaging portion 3 includes a light receiving surface 6 for imaging a subject 20.

The welding machine 2 (not illustrated) is transported to a welded product holding portion configured of the first holding portion 4 and the second holding portion 5 by a welded product gripping arm (not illustrated). A welded product (subject 20) during the welding and before and after the welding is captured by the imaging portion 3, the quality is determined by analyzing the obtained image data, and the result thereof is output to a control system of a production system or is notified with respect to a field supervisor. In addition, in FIG. 1, as a part of the configuration of the welding machine 2, the welding monitoring system 1 is illustrated.

Relative positions of the light receiving surface 6, the first mirror 8, and the third mirror 10 with respect to the first holding portion 4 are fixed, by a method, such as fastening. Relative positions of the second mirror 9 and the fourth mirror 11 with respect to the second holding portion 5 are fixed by a method, such as fastening.

A method for keeping the entire circumference of the side surface of the subject 20 within an imaging viewing field by one light receiving surface 6, will be described.

In order to make it easy to understand the description, as a surface that becomes an imaging target, a virtual square pole side surfaces that are externally in contact with the subject 20 are considered, and one of the surfaces is referred to as a subject front surface 21, surfaces orthogonal to the subject front surface 21 are referred to as a subject first side surface 22 and a subject second side surface 23, and a surface which opposes the subject front surface 21 is referred to as a subject rear surface 24.

The subject front surface 21 opposes the light receiving surface 6 substantially to be parallel thereto, and is kept within the imaging viewing field. Hereinafter, a direction which is parallel to a normal line of the subject front surface 21 and is oriented toward the light receiving surface 6 from the subject front surface 21 is referred to as a first direction 25. In addition, a direction which is parallel to a normal line of the subject first side surface 22 and is oriented toward the subject first side surface 22 from the subject second side surface 23 is referred to as a second direction 26.

The first mirror 8 is installed such that the light receiving surface 6 keeps the subject first side surface 22 in the viewing field. In other words, the first mirror 8 is installed to be substantially parallel to a bisector of the first direction 25 and the second direction 26.

The second mirror 9 is installed such that the light receiving surface 6 keeps the subject second side surface 23 in the viewing field. In other words, the second mirror 9 is installed to be substantially parallel to a bisector of a direction opposite to the first direction 25, and the second direction 26.

The third mirror 10 and the fourth mirror 11 are installed such that the light receiving surface 6 keeps the subject rear surface 24 in the viewing field. In other words, the third mirror 10 is installed substantially to be parallel to the first mirror, and the fourth mirror 11 is installed to be substantially parallel to the second mirror 9.

In FIG. 1, paths through which light to be generated on four surfaces that surround the subject 20 reaches the light receiving surface 6 are illustrated as optical paths 27A to 27D.

The welding monitoring system 1 includes optical path length adjustment portions 28A to 28D in front of the light receiving surface 6 on the path through which the optical paths 27A to 27D pass. The optical path length adjustment portions 28A to 28D use a transparent material (for example, glass or crystal) of which a refractive index is equal to or greater than 1. When the light passes through the material of which the refractive index is equal to or greater than 1, by using the optical path length obtained by multiplying the refractive index by the length of the material, focusing is performed. In other words, in accordance with the optical path to the light receiving surface 6 from each of the side surfaces of the subject 20, by adjusting the optical path lengths of the optical path length adjustment portions 28A to 28D, the optical lengths of the optical paths 27A to 27D are arranged.

By the above-described configuration, it is possible to keep the entire circumference of the subject in the imaging viewing field of the imaging portion 3, and to simultaneously image the entire circumference by one camera (imaging portion 3).

Next, a method for fixing a position of the subject 20 will be described. A driving mechanism is provided in the first holding portion 4 or in the second holding portion 5, or in both of the first holding portion 4 and the second holding portion 5, and the second holding portion 5 can relatively move along the first direction 25 with respect to the first holding portion 4. By the movement, the subject 20 is interposed and held by the first holding portion 4 and the second holding portion 5. By the holding method, the subject front surface 21 is in contact with a front surface holding surface 13 of the first holding portion 4, and the subject rear surface 24 is in contact with a rear surface holding surface 14 of the second holding portion 5.

In addition, the welding monitoring system 1 includes a load applying mechanism 12 which applies a load to the subject 20 along the second direction 26. By the action of the load applying mechanism 12, when the subject 20 is held, the subject 20 receives the load in the second direction 26 and is in contact with a side surface holding surface 15 of the first holding portion 4.

In this manner, the subject 20 is held by the first holding portion 4 and the second holding portion 5, and the position thereof is determined.

Next, the reason why the images on four surfaces are focused even in a case of components having different sectional sizes, will be described with reference to FIG. 2.

By the configuration described above, the first mirror to the fourth mirror (reference numbers 8 to 11) and the optical path length adjustment portions 28A to 28D (not illustrated in FIG. 2) are installed to be focused in a case where the subject 20 having a certain diameter (radius r) is set. In FIG. 2, the situation is illustrated by dotted lines. Here, a case where components having different radiuses (r+Δ) are set in the welding monitoring system 1 is considered. In FIG. 2, the situation is illustrated by solid lines. A case where the optical path lengths of the optical paths 27A to 27D from each of the side surfaces (the subject front surface 21, the subject first side surface 22, the subject second side surface 23, and the subject rear surface 24) of the subject 20 to the light receiving surface 6 do not respectively change, will be described hereinafter.

First, the focus of the subject front surface 21 will be described. The subject front surface 21 is in contact with the first holding portion 4, and thus, there is no relative displacement with respect to the first holding portion 4 along the first direction 25. In addition, the relative positional relationship between the light receiving surface 6 and the first holding portion 4 is fixed. Therefore, even when the sectional size of the subject 20 changes, a state of being in focus without changing the distance between the subject front surface 21 and the light receiving surface 6, can be held.

Next, the focus of the subject first side surface 22 will be described. The subject first side surface 22 is relatively displaced substantially only by Δ with respect to the first holding portion 4 in a direction reverse to the second direction 26. In addition, the subject first side surface 22 is not relatively displaced with respect to the first holding portion 4 along the second direction 26. On the optical path 27D, a point on the subject first side surface 22 is D1, a point reflected by the first mirror 8 is D2, and a point that has reached the light receiving surface is D3.

By changing the sectional size of the subject 20, the distance between D1 and D2 is shortened by Δ, and the distance between D2 and D3 extends by Δ, and thus, the sum of the distance becomes exactly zero. Therefore, even when the sectional size of the subject 20 changes, it is possible to hold a state of being in focus without changing the distance between the subject first side surface 22 and the light receiving surface 6.

Next, focus on the subject second side surface 23 will be described. The subject second side surface 23 is relatively displaced substantially by Δ with respect to the first holding portion 4 in the direction reverse to the first direction 25. In addition, the subject second side surface 23 is relatively displaced substantially by 2Δ with respect to the first holding portion 4 in the direction reverse to the second direction 26. Furthermore, the second mirror 9 which is on the optical path 27A is relatively displaced substantially by 2Δ with respect to the first holding portion 4 in the direction reverse to the first direction 25.

On the optical path 27A, a point on the subject second side surface 23 is A1, a point reflected by the second mirror 9 is A2, and a point that has reached the light receiving surface is A3.

By changing the sectional size of the subject 20, the distance between A1 and A2 is shortened by Δ, the distance between A2 and A3 extends by Δ, and thus, the sum of the distance becomes exactly zero. Therefore, even when the sectional size of the subject 20 changes, it is possible to hold a state of being in focus without changing the distance between the subject second side surface 23 and the light receiving surface 6.

Next, focus on the subject rear surface 24 will be described. The subject rear surface 24 is relatively displaced substantially by 2Δ with respect to the first holding portion 4 in the direction reverse to the first direction 25. In addition, the subject rear surface 24 is relatively displaced substantially by Δ with respect to the first holding portion 4 in the direction reverse to the second direction 26. Furthermore, the third mirror 10 which is on the optical path 27B is relatively displaced substantially by 2Δ with respect to the first holding portion 4 in the direction reverse to the first direction 25.

On the optical path 27B, a point on the subject rear surface 24 is B1, a point reflected by the third mirror 10 is B2, a point reflected by the fourth mirror 11 is B3, and a point that has reached the light receiving surface is B4.

By changing the sectional size of the subject 20, the distance between B1 and B2 extends by Δ, the distance between B2 and B3 is shortened by 4Δ, the distance between B3 and B4 extends by 3Δ, and thus, the sum of the distance becomes exactly zero. Therefore, even when the sectional size of the subject 20 changes, it is possible to hold a state of being in focus without changing the distance between the subject rear surface 24 and the light receiving surface 6.

Figure 3:
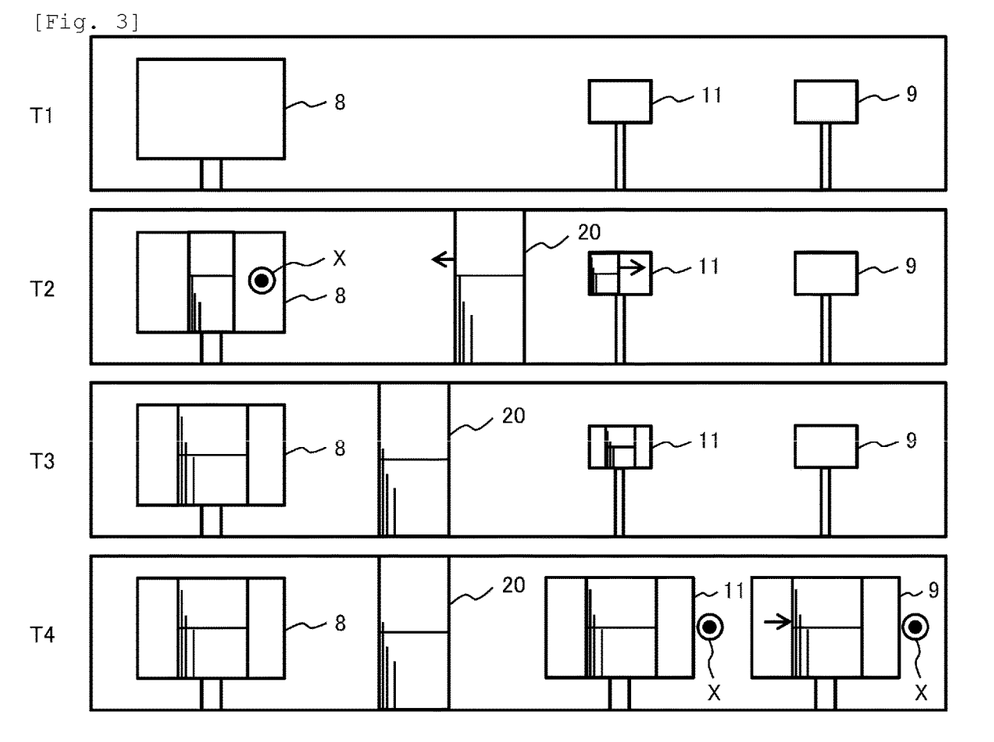
FIG. 3 is a schematic view of a subject picture imaged by the welding monitoring system of FIG. 1.

A picture in a process from the setting of the subject 20 in the subject holding portion to the welding is illustrated in FIG. 3. The process is arranged in a time-series order from top (T1) to bottom (T4) of FIG. 3, and in T1, in a state where the subject 20 is not set, only the mirrors (reference numbers 8, 9, and 11) are kept within the imaging viewing field. In addition, before the subject 20 is set, the first holding portion 4 and the second holding portion 5 are separated from each other, and thus, compared to the first mirror 8 fixed to the first holding portion 4, the second mirror 9 and the fourth mirror 11 which are fixed to the second holding portion 5 are projected to be small.

Figure 2:
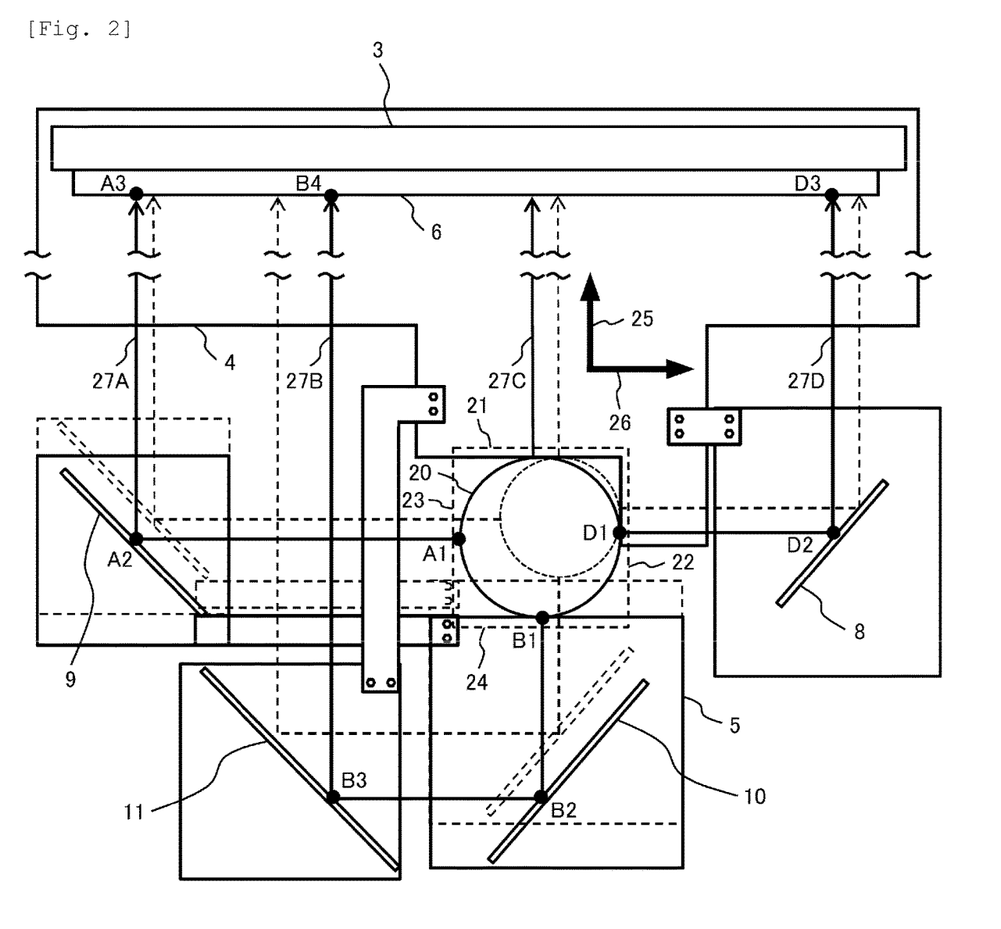
FIG. 2 is a view illustrating that cases where two subjects having different diameters are respectively set overlap each other, in the welding monitoring system of FIG. 1.

In T2, a picture in the middle of movement of the subject 20 by a transport arm toward the right side from the left side on a paper surface of FIG. 2 is illustrated. An arrow illustrated in T2 illustrates a moving direction of the subject 20. In addition, a symbol X illustrates a direction toward the near side from the far side on the paper surface.

In T3, a state where the movement of the transport arm is finished is illustrated. T4 illustrates a state after the second holding portion 5 relatively moves with respect to the first holding portion 4, and holds the subject 20. As the second mirror 9 and the fourth mirror 11 approach the first holding portion 4, the entire side surface of the subject 20 enters the imaging viewing field, and the preparation of imaging during the welding is completed. After the welding, the picture to be reproduced is recorded from T4 to T1 in reverse.

<Action and Effect>

In this manner, in the welding monitoring system 1 according to the first embodiment, the mirror for keeping the entire circumference of the subject within the viewing field of the light receiving surface can automatically perform the focusing by moving in accordance with the sectional size of the subject 20. In other words, by cancelling the displacement of the optical path caused by the change in subject size by the displacement of the subject holding portion, the entire circumference of the subject can be focused.

Example 2

Figure 4:
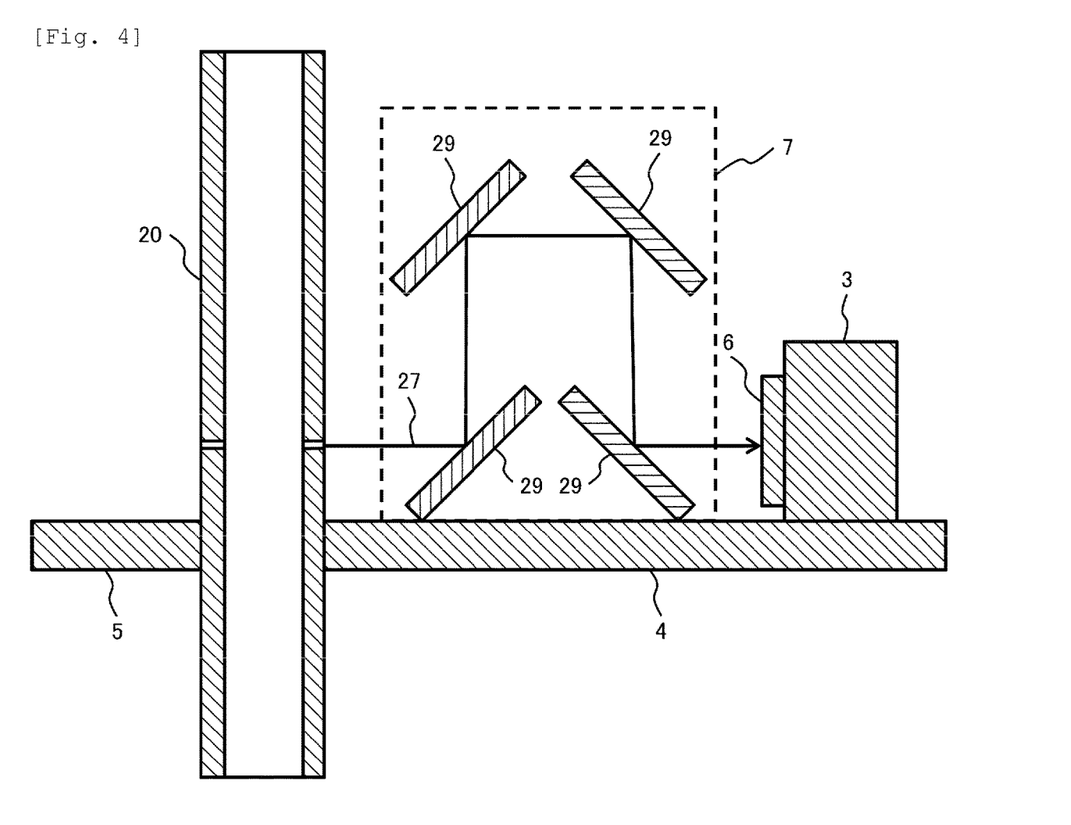
FIG. 4 is a schematic sectional view of a welding monitoring system according to a second embodiment of the present invention.

A welding monitoring system according to a second embodiment of the present invention will be described with reference to FIG. 4. FIG. 4 is a schematic view of the welding monitoring system 1 according to the embodiment.

The welding monitoring system 1 according to the embodiment is different from the configuration of the welding monitoring system 1 according to the first embodiment in the configuration of the optical path length adjustment portion 28. Since other configurations of the welding monitoring system 1 according to the embodiment are the same as those of the welding monitoring system 1 according to the first embodiment, the description thereof will be omitted.

In the welding monitoring system 1 according to embodiment, an optical path length adjustment portion 7 includes a plurality of optical path length extending mirrors 29 instead of the transparent material of which the refractive index is equal to or greater than 1. Without changing a start point (subject 20) of the optical paths 27A to 27D, each of the reflection points by the first mirror 8 to the fourth mirror 11, and a final point (light receiving surface 6), the optical path length extending mirror 29 is installed to make the optical path lengths uniform by extending the optical path lengths by bending the middle part of the path. Accordingly, a function of making the optical path lengths of optical paths 27 uniform can be realized by bending the optical path not only in a linear space between the imaging target part and the light receiving surface 6 but also in the direction perpendicular thereto, and the installation space can be more efficiently used.

<Action and Effect>

In this manner, in the welding monitoring system 1 according to the second embodiment, not only the effects similar to those of the welding monitoring system according to the first embodiment can be obtained, but also it is possible to more efficiently use the installation space of the configuration member of the welding monitoring system 1 by configuring the optical path length adjustment portion 7 by the plurality of optical path length extending mirrors 29.

Example 3

Figure 5:
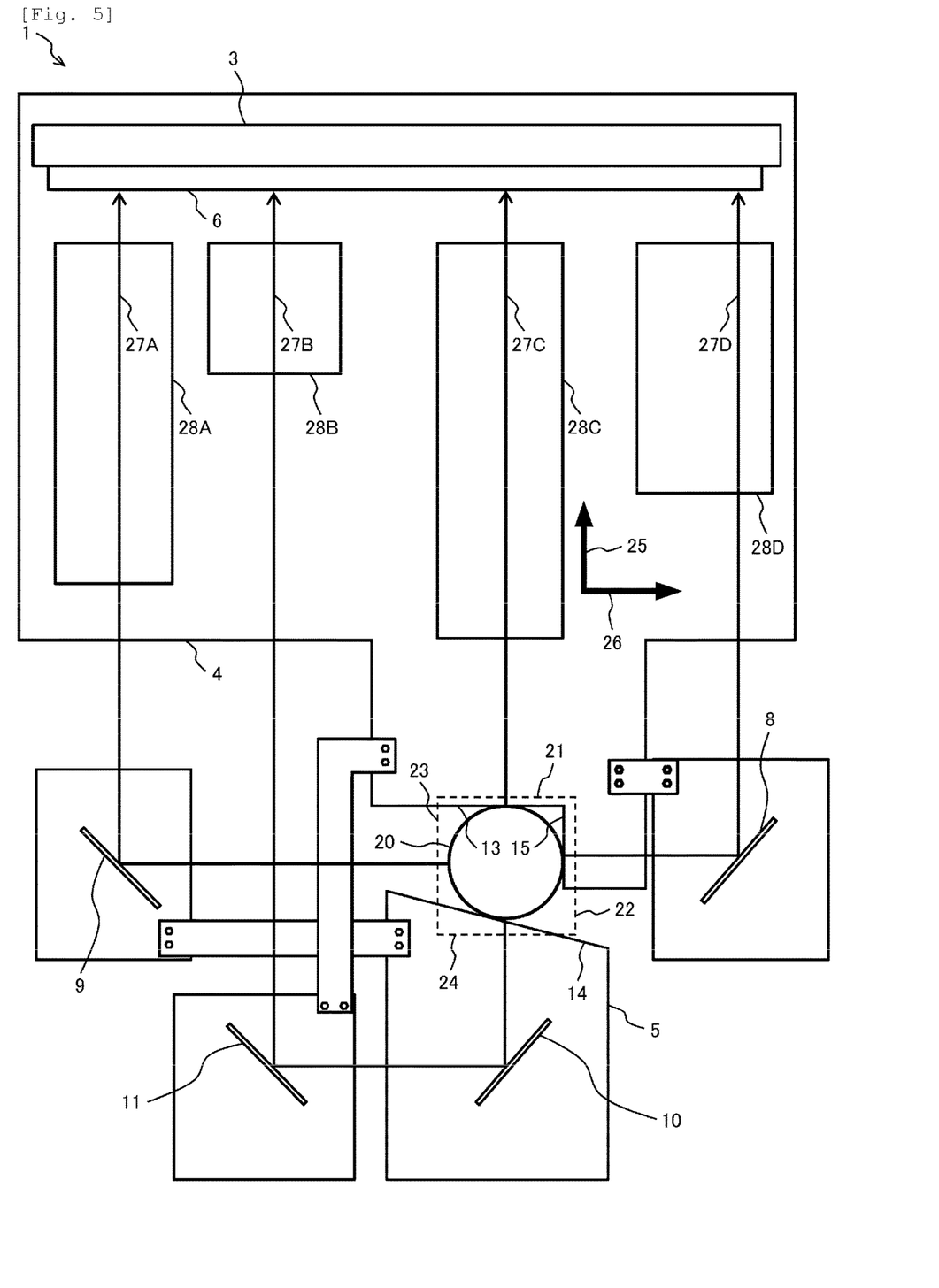
FIG. 5 is a schematic view of a welding monitoring system according to a third embodiment of the present invention.

A welding monitoring system according to a third embodiment of the present invention will be described with reference to FIG. 5. FIG. 5 is a schematic view of the welding monitoring system 1 according to the embodiment.

The welding monitoring system 1 according to the embodiment is different from the configuration of the welding monitoring system 1 according to the first embodiment in that the second holding portion 5 also functions as the load applying mechanism 12. Since other configurations of the welding monitoring system 1 according to the embodiment are the same as those of the welding monitoring system 1 according to the first embodiment, the description thereof will be omitted.

In the welding monitoring system 1 according to the embodiment, the applying of the load in the second direction 26 of the subject 20 which is an action of the load applying mechanism 12 is realized by the configuration of the rear surface holding surface 14 of the second holding portion 5. The rear surface holding surface 14 is not parallel to the front surface holding surface 13 of the first holding portion 4, and a normal line thereof is configured to have not only the component of the first direction 25 but also the component of the second direction 26.

Accordingly, as the second holding portion 5 moves toward the first direction 25 with respect to the first holding portion 4 and comes into contact with the subject 20, it is possible to apply the load in the second direction 26 to the subject 20. By the above-described configuration, even when eliminating the load applying mechanism 12 which is provided in the welding monitoring system 1 according to the first embodiment, it is possible to obtain similar effects.

<Action and Effect>

In this manner, in the welding monitoring system 1 according to the third embodiment, not only the effects similar to those of the welding monitoring system according to the first embodiment can be obtained, but also it is possible to eliminate the configuration member of the welding monitoring system 1 by the configuration in which the second holding portion 5 also plays a role of the load applying mechanism 12.

Example 4

Figure 6:
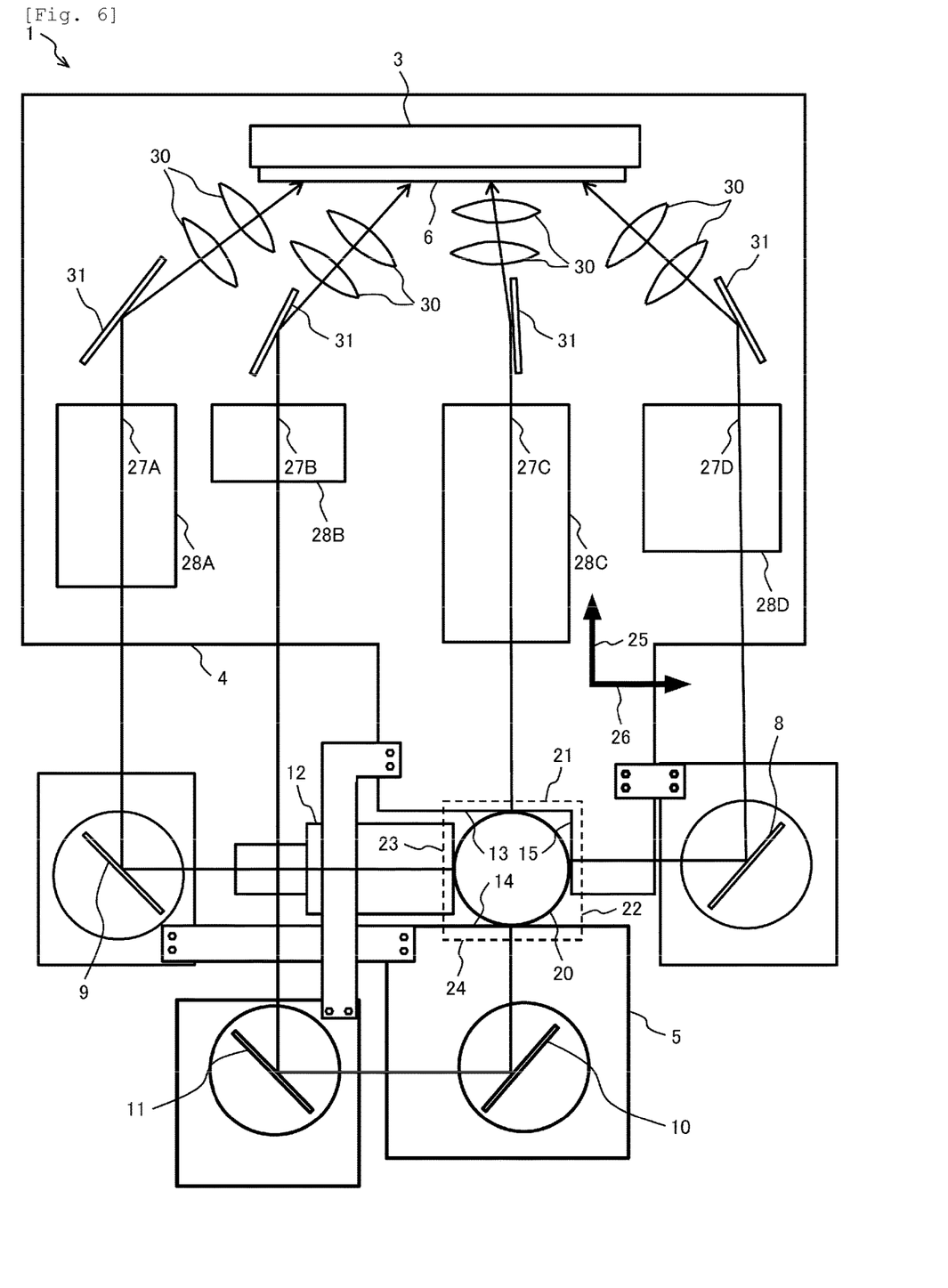
FIG. 6 is a schematic view of a welding monitoring system according to a fourth embodiment of the present invention.

A welding monitoring system according to a fourth embodiment of the present invention will be described with reference to FIG. 6. FIG. 6 is a schematic view of the welding monitoring system 1 according to the embodiment.

The welding monitoring system 1 according to the embodiment is different from the configuration of the welding monitoring system 1 according to the first embodiment in that a magnifying lens 30 and a condensing mirror 31 are provided in front of the light receiving surface 6. Since other configurations of the welding monitoring system 1 according to the embodiment are the same as those of the welding monitoring system 1 according to the first embodiment, the description thereof will be omitted.

In the welding monitoring system 1 according to the embodiment, in front of the light receiving surface 6 in the middle of the optical paths 27A to 27D, the magnifying lens 30 and the condensing mirror 31 are installed. Accordingly, the light generated from each of the side surfaces (the subject front surface 21, the subject first side surface 22, the subject second side surface 23, and the subject rear surface 24) of the subject 20 is condensed to be densely focused on the light receiving surface 6. By the above-described configuration, it is possible to perform the imaging by improving resolution of the subject 20.

<Action and Effect>

In this manner, in the welding monitoring system 1 according to the fourth embodiment, not only the effects similar to those of the welding monitoring system 1 according to the first embodiment can be obtained, but also it is possible to perform the imaging by improving the resolution of the subject 20 by providing the magnifying lens 30 and the condensing mirror 31 of the light receiving surface 6.

Example 5

Figure 7:
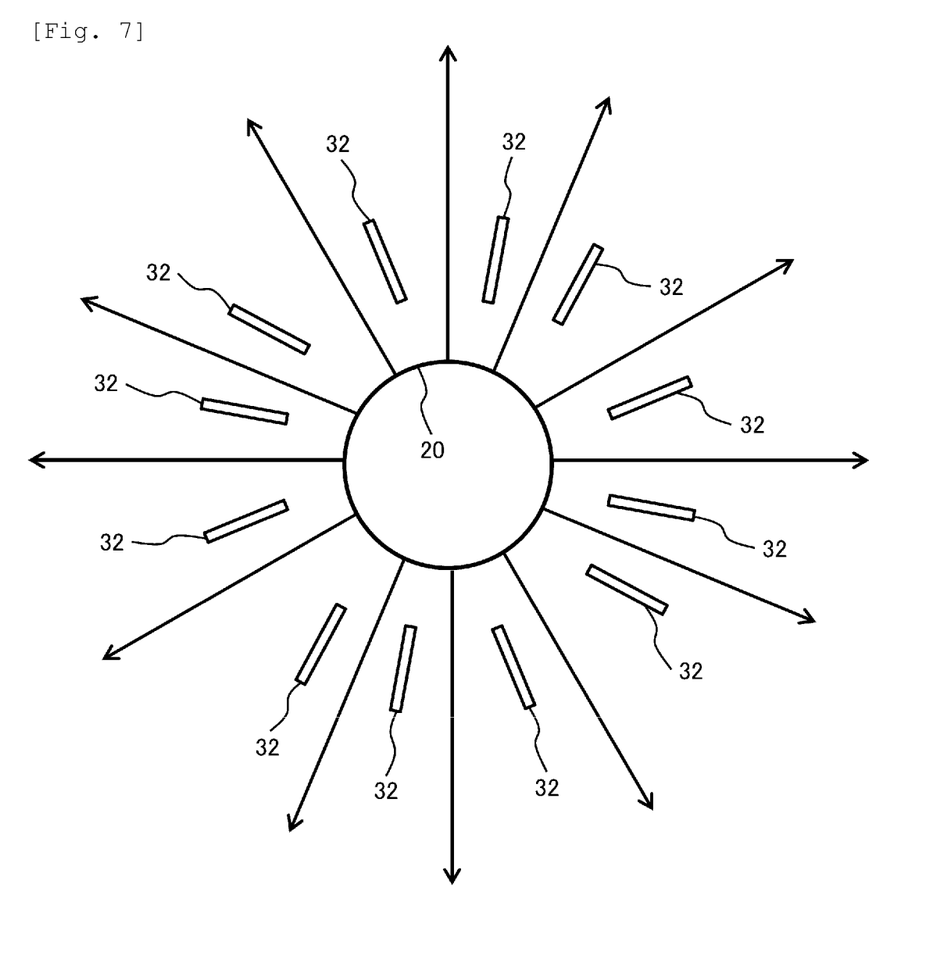
FIG. 7 is a schematic view of the periphery of the subject according to a fifth embodiment of the present invention.

A welding monitoring system according to a fifth embodiment of the present invention will be described with reference to FIG. 7. FIG. 7 is a schematic view of the periphery of the subject 20 according to the embodiment.

The welding monitoring system 1 according to the embodiment is different from the configuration of the welding monitoring system 1 according to the first embodiment in that a slit 32 is installed on the periphery of the subject 20. Since other configurations of the welding monitoring system 1 according to the embodiment are the same as those of the welding monitoring system 1 according to the first embodiment, the description thereof will be omitted.

In the welding monitoring system 1 according to the embodiment, a plurality of the radial slits 32 around the subject 20 are provided on the periphery of the subject 20. By the slit 32, it is possible to perform the imaging by extracting a ray of light which is substantially perpendicular to a curved surface (surface of the subject 20) from the generated light of the subject 20. Therefore, it is possible to narrow a point on the subject 20 which is a starting point of the ray of light that has reached each point on the light receiving surface 6, and to suppress widening (blur) of the image.

<Action and Effect>

In this manner, in the welding monitoring system 1 according to the fifth embodiment, not only the effects similar to those of the welding monitoring system 1 according to the first embodiment can be obtained, but also it is possible to suppress blur during the imaging by providing the slit 32 on the periphery of the subject 20.

Example 6

Figure 8:
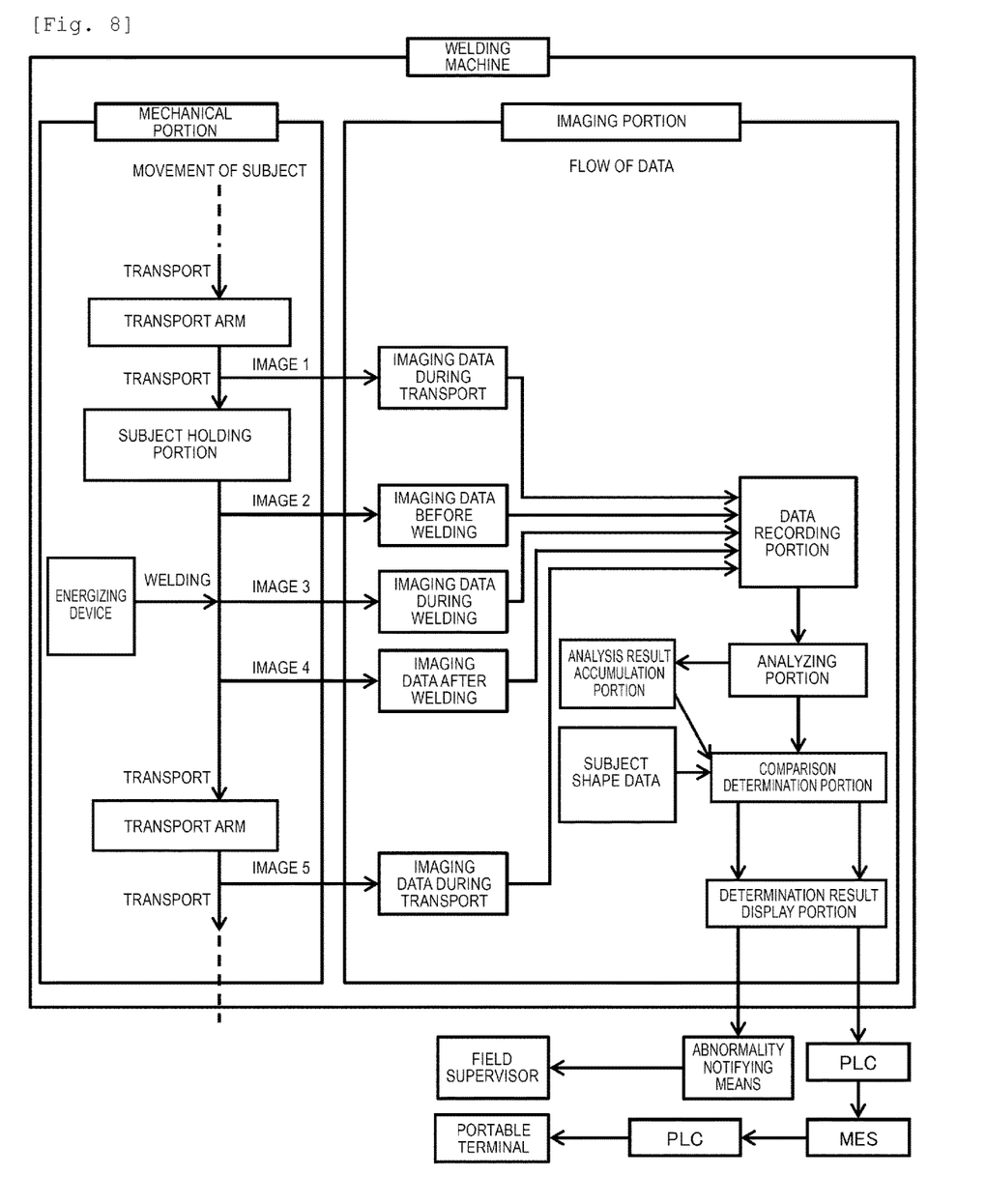
FIG. 8 is a schematic view illustrating an operation of a welding monitoring system and a flow of imaging data processing according to a sixth embodiment of the present invention.
Figure 9:
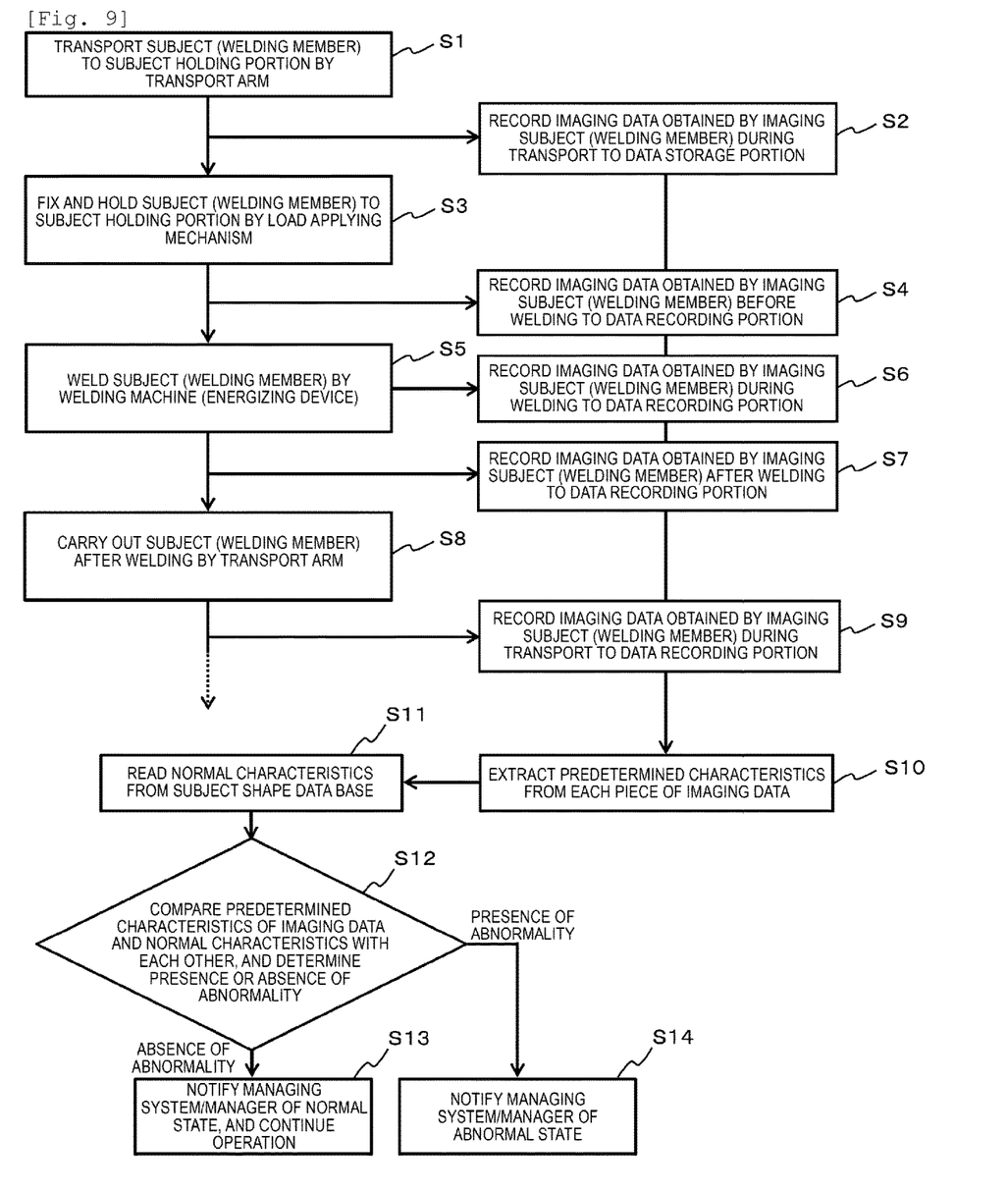
FIG. 9 is a flowchart illustrating a welding monitoring method according to the sixth embodiment of the present invention.

A welding monitoring system and a welding monitoring method according to a sixth embodiment of the present invention will be described with reference to FIGS. 8 and 9. FIG. 8 is a schematic view of a system configuration of the welding monitoring system 1 according to the embodiment. FIG. 9 is a flowchart illustrating a welding monitoring method according to the embodiment.

The embodiment is different from the configuration of the welding monitoring system 1 according to the first embodiment in that a series of information processing and control systems is provided. Since other configurations of the welding monitoring system 1 according to the embodiment are the same as those of the welding monitoring system 1 according to the first embodiment, the description thereof will be omitted.

The welding monitoring system 1 according to the embodiment is configured of the mechanical portion which transports the subject 20 for the welding at a predetermined position, and the imaging portion which determines the quality by imaging the subject 20 and analyzing the image data. The mechanical portion includes, for example, the transport arm, the subject holding portion, and the energizing device. The imaging portion includes, for example, a data recording portion, an analyzing portion, a comparison determination portion, and a determination result display portion (determination result output portion).

The imaging portion images a subject in each process of the operation of the mechanical portion. Specifically, for example, the imaging is performed in a process in which the transport arm transports the subject to the subject holding portion (imaging 1), a subject after the holding by the subject holding portion (imaging 2), a process of operating the energizing device and performing the welding (imaging 3), a subject after the welding (imaging 4), and a process in which the subject is transported by the transport arm again for performing the process after the welding (imaging 5).

The imaging data of the subject 20 obtained in this manner is transported to the data recording portion, and characteristics which are required in determination of the quality in the analyzing portion are extracted. The analysis result is input to the comparison determination portion, and is recorded in an analysis result accumulation portion. In the comparison determination portion, for example, compared to the previous data recorded in the analysis result accumulation portion or subject shape data, the presence or absence of abnormality is output. The abnormality is notified with respect to a field supervisor by abnormality informing means, and is informed with respect to a manufacturing execution system (MES) which controls the entire production system or a portable terminal via a programmable logic controller (PLC), and thus, necessary controls are performed.

A specific example of abnormality to be sensed will be described. From the picture of the process in which the transport arm transports the subject to the subject holding portion (imaging 1), it is possible to investigate necessity of maintenance of a driving portion of the arm by calculating an operation speed of the transport arm and by sensing the presence or absence of the abnormality of the arm. From the picture of the subject (imaging 2) after the holding performed by the subject holding portion, it is possible to sense whether or not the subject is held at a predetermined position, and to investigate whether or not the welding is performed at a predetermined positional relationship. From the picture of the process of operating the energizing device and performing the welding (imaging 3), it is possible to investigate the possibility of a welding defect by analyzing the light generation of the subject. From the picture of the subject after the welding (imaging 4), it is possible to sense the presence or absence of damage or dirt of the subject, and to investigate whether or not the predetermined quality of external appearance is satisfied. From the picture of the process of operating the transport arm again for performing the process after the welding (imaging 5), it is possible to investigate the presence or absence of abnormality of the arm again.

The welding monitoring method of the embodiment described above is illustrated in the flowchart of FIG. 9. First, the subject (welding member) is transported to the subject holding portion by the transport arm (step S1). The subject (welding member) during the transport is captured, and the imaging data is recorded in the data recording portion (step S2).

Next, the subject (welding member) is fixed and held to the subject holding portion by the load applying mechanism (step S3). In a state where the subject (welding member) is held by the subject holding portion, the subject (welding member) before the welding is captured, and the imaging data is recorded in the data recording portion (step S4).

Then, the subject (welding member) is welded by the energizing device (welding machine) (step S5). The subject (welding member) during the welding is captured, and the imaging data is recorded in the data recording portion (step S6). Furthermore, in a state where the subject (welding member) is held by the subject holding portion, the subject (welding member) after the welding is captured, and the imaging data is recorded in the data recording portion (step S7).

Then, the subject (welding member) after the welding is carried out by the transport arm (step S8). The subject (welding member) during the transport is captured, the imaging data is recorded in the data recording portion (step S9).

Then, the predetermined characteristics are extracted from the imaging data obtained in each of the steps (step S10).

After this, normal characteristics are read from a subject shape data base (step S11). The predetermined characteristics of the imaging data extracted in step S10 and the normal characteristics of the subject read in step S11 are compared to each other, and the presence or absence of abnormality is determined (step S12). In a case where it is determined that the abnormality is absent, the process moves to step S13, the content that the state is normal is notified with respect to the managing system or the manager, and the operation of the welding machine continues. Meanwhile, in a case where it is determined that the abnormality is present, generation of the abnormality is notified with respect to the managing system or the manager (step S14).

<Action and Effect>

In this manner, in the welding monitoring system 1 according to the sixth embodiment, not only the effects similar to those of the welding monitoring system 1 according to the first embodiment can be obtained, but also it is possible to sense the abnormality in the welding process, and to control the operation situation of a production line, by analyzing the image data obtained by the imaging portion.

In addition, the present invention is not limited to the above-described examples, and various modification examples are included. For example, the above-described examples are described in detail for making it easy to understand the present invention, and are not limited to the example in which all of the described configurations are necessarily provided. In addition, it is possible to replace a part of the configuration of a certain example with a configuration of other examples, and it is also possible to add a configuration of other examples to the configuration of a certain configuration. In addition, it is possible to add, eliminate, and replace other configurations with respect to a part of the configuration of each of the examples.

REFERENCE SIGNS LIST

1 . . . WELDING MONITORING SYSTEM
2 . . . WELDING MACHINE
3 . . . IMAGING PORTION
4 . . . FIRST HOLDING PORTION
5 . . . SECOND HOLDING PORTION
6 . . . LIGHT RECEIVING SURFACE
7 . . . OPTICAL PATH LENGTH ADJUSTMENT PORTION
8 . . . FIRST MIRROR
9 . . . SECOND MIRROR
10 . . . THIRD MIRROR
11 . . . FOURTH MIRROR
12 . . . LOAD APPLYING MECHANISM
13 . . . FRONT SURFACE HOLDING SURFACE
14 . . . REAR SURFACE HOLDING SURFACE
15 . . . SIDE SURFACE HOLDING SURFACE
20 . . . SUBJECT
21 . . . SUBJECT FRONT SURFACE
22 . . . SUBJECT FIRST SIDE SURFACE
23 . . . SUBJECT SECOND SIDE SURFACE
24 . . . SUBJECT REAR SURFACE
25 . . . FIRST DIRECTION
26 . . . SECOND DIRECTION
27, 27A, 27B, 27C, 27D . . . OPTICAL PATH
28, 28A, 28B, 28C, 28D . . . OPTICAL PATH LENGTH ADJUSTMENT PORTION
29 . . . OPTICAL PATH LENGTH EXTENDING MIRROR
30 . . . MAGNIFYING LENS
31 . . . CONDENSING MIRROR
32 . . . SLIT

The invention claimed is:

1. A welding monitoring system which monitors a welding subject, comprising:
a mechanical apparatus;
an imaging apparatus comprising a camera; and
a plurality of optical path length adjustment portions,
wherein the mechanical apparatus comprises:
    a transport arm which transports the welding subject, and
    a welding subject holder which holds the welding subject comprised of a first welding subject holder and a second welding subject holder, and
wherein the imaging apparatus comprises:
    a light receiving surface to which a relative position with respect to the first welding subject holder is fixed,
    a first holding section mirror to which the relative position with respect to the first welding subject holder is fixed, and
    a second holding section mirror to which a relative position with respect to the second welding subject holder is fixed,
wherein the first holding section mirror and the second holding section mirror are disposed such that the held welding subject enters an imaging viewing field of the imaging apparatus,
wherein the welding subject is imaged by the imaging apparatus in a state where the welding subject is in contact with both of the first welding subject holder and the second welding subject holder, and
wherein the plurality of optical path length adjustment portions are located in front of the light receiving surface, each of the plurality of optical path length adjustment portions is formed of a transparent material of which a refractive index is equal to or greater than 1 and is on a respective optical path to the light receiving surface from the welding subject, and are configured to be adjusted to focus the optical path to the light receiving surface,
wherein the second holding section mirror comprises a second mirror for imaging a welding subject side surface, and a third mirror for imaging a welding subject rear surface, and
wherein the first holding section mirror is provided with a first mirror for imaging the welding subject side surface, and a fourth mirror for imaging the welding subject rear surface, the fourth mirror arranged to reflect the light from the third mirror.

2. The welding monitoring system according to claim 1, wherein each optical path length adjustment portion is configured of one or more mirrors on the respective optical path to the light receiving surface from the welding subject.

3. The welding monitoring system according to claim 1, further comprising:
a loader which applies a load in the first welding subject holder direction to the welding subject.

4. The welding monitoring system according to claim 1, wherein a surface which is in contact with the welding subject of the second welding subject holder is configured to have a direction component in which a normal line thereof is oriented toward the light receiving surface from the welding subject, and a direction component in which the normal line is oriented toward the surface that is in contact with the welding subject of the first welding subject holder substantially in parallel to the light receiving surface.

5. The welding monitoring system according to claim 1, wherein the imaging apparatus comprises a plurality of radial slits around the welding subject in the vicinity of the welding subject.

6. The welding monitoring system according to claim 1, wherein the mechanical apparatus further comprises a welding machine configured to perform welding with respect to the welding subject.

7. The welding monitoring system according to claim 1, wherein the imaging apparatus further comprises a processor configured to:
   obtain imaging data of the welding subject,
   record the obtained imaging data;
   extract predetermined characteristics from the obtained imaging data;
   compare the extracted characteristics and normal characteristics to each other to determine the presence or absence of abnormality; and
   output a determination result based on comparing the extracted characteristics and normal characteristics.

8. The welding monitoring system according to claim 1, wherein the plurality of optical path length adjustment portions are adjustable so as to maintain an entire circumference of the welding subject in the imaging viewing field and to simultaneously image the entire circumference by the camera.

* * * * *